(12) United States Patent
Kataoka et al.

(10) Patent No.: US 8,810,853 B2
(45) Date of Patent: Aug. 19, 2014

(54) OPTIMIZING A LINE WIDTH OF BAR CODES PRINTED BY VARIABLE PRINTING

(75) Inventors: Yasufumi Kataoka, Kyoto (JP); Toshio Manki, Kyoto (JP); Hiroyuki Shibata, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 68 days.

(21) Appl. No.: 13/620,696

(22) Filed: Sep. 14, 2012

(65) Prior Publication Data
US 2013/0083334 A1 Apr. 4, 2013

(30) Foreign Application Priority Data
Sep. 30, 2011 (JP) ................. 2011-215883

(51) Int. Cl.
*G06K 15/02* (2006.01)
(52) U.S. Cl.
USPC ........................................ 358/1.2
(58) Field of Classification Search
CPC .............. H04N 1/3935; G06K 7/1413; G06K 19/06028; G06K 1/121
USPC ........................................ 358/1.2
See application file for complete search history.

(56) References Cited

U.S. PATENT DOCUMENTS

| | | | |
|---|---|---|---|
| 2003/0048460 A1* | 3/2003 | Vinals-Matas et al. | 358/1.8 |
| 2004/0164154 A1 | 8/2004 | Aigeldinger | |
| 2008/0030771 A1 | 2/2008 | Alleshouse | |
| 2008/0304891 A1 | 12/2008 | Saijo et al. | |

FOREIGN PATENT DOCUMENTS

| | | |
|---|---|---|
| JP | 2008-003994 A | 1/2008 |
| JP | 2009193428 A | 8/2009 |

OTHER PUBLICATIONS

European Search Report EP Application No. EP 12 17 8453 dated Oct. 17, 2013.

* cited by examiner

*Primary Examiner* — Eric A Rust
(74) *Attorney, Agent, or Firm* — McDermott Will & Emery LLP (57) ABSTRACT

A print data processing apparatus 4 includes a page data creating apparatus 1 and a rasterization processing apparatus 2. The page data creating apparatus 1 includes, as functional elements thereof, a common object defining unit 11, an allocating condition setting unit 12, a correction information embedding unit 13, and a page data generating unit 14. The rasterization processing apparatus 2 includes, as functional elements thereof, an analyzing unit 20 having a correction information searching unit 21 and a resolution acquiring unit 22, a correcting unit 23, and a raster data generating unit 25.

7 Claims, 6 Drawing Sheets

24

| output machine | output resolution for thinning direction | paper | bar-code type | width | thinning amount |
|---|---|---|---|---|---|
| IJ-A | 360dpi | high quality paper | GS1-128 | 50-60mm | 1 pixel |
| IJ-A | 720dpi | high quality paper | GS1-128 | 50-60mm | 2 pixel |
| ⋮ | ⋮ | ⋮ | ⋮ | ⋮ | ⋮ |

| output machine | output resolution for thinning direction | paper | bar-code type | width | thinning amount |
|---|---|---|---|---|---|
| IJ-A | 360dpi | high quality paper | GS1-128 | 50-60mm | 1 pixel |
| IJ-A | 720dpi | high quality paper | GS1-128 | 50-60mm | 2 pixel |
| ⋮ | ⋮ | ⋮ | ⋮ | ⋮ | ⋮ |

OPTIMIZING A LINE WIDTH OF BAR CODES PRINTED BY VARIABLE PRINTING

BACKGROUND OF THE INVENTION

1. Field of the Invention

This invention relates to a print data processing apparatus, a print data processing method, a printing system and program, a page data creating apparatus, and a rasterization processing apparatus.

2. Description of the Related Art

Conventionally, a printing system is known, in which a front-end apparatus such as a personal computer generates page data written in a page description language such as PostScript (registered trademark of Adobe Systems, U.S.A.) or PDF (Portable Document Format), the page data is put to a rasterization process for converting it into raster data, and then the data is printed on a recording medium by a back-end machine such as a plate recorder or a digital printing press. In recent years, a technique called variable printing has been proposed, which produces prints including a portion (fixed area) having the same contents throughout a plurality of pages, and a portion (variable area) having different contents for each page. In printing direct mail, for example, besides the contents of guidance common to all individuals, the names, addresses, control codes and so on of different individuals are printed on paper while being changed from those of one individual to another.

Bar codes expressing the control codes and so on are read by a bar-code reader after being printed on a recording medium. In bar-code printing, therefore, the bar codes need to be printed in such a quality as to be readable by the bar-code reader. Japanese Unexamined Patent Publication No. 2008-3994 discloses a printing system having a function to thicken extra-fine lines which could otherwise become indistinct when printed. In a printing method based on image specifications according to which each bar of bar codes is filled to be a rectangular shape and outlined with extra-fine lines, the extra-fine lines are thickened for print data other than the bar codes, such as tables and ruled lines. In this method, the outlines of the bar codes are excluded from the correction for thickening the extra-fine lines, thereby to avoid a reduction in the accuracy of reading the bar codes due to the thickening of each bar of the bar codes.

However, the line width of the bar codes printed on paper is variable in different ways according to the printing methods (e.g. electrophotographic mode, inkjet mode, and so on) and the types of output machine, the types of printing paper, and so on. Therefore, as described in Japanese Unexamined Patent Publication No. 2008-3994, even when the correction for thickening the outlines of the bar codes is not carried out, when the bar codes are printed with an inkjet printer, for example, there arises a problem of lowering reading accuracy due to the width of each bar of the bar codes made thicker by blotting of ink on the paper than is optimal.

To deal with such problem of the width of each bar of the bar codes as printed becoming thicker than is optimal, a method can be employed in which a front-end apparatus is used to create a bar-code pattern with the width of each bar thinned beforehand, taking a thickening amount into account, and output the pattern as page data. However, since the thickening amount is variable with the output machine, output resolution, paper characteristic, and so on, such information must be acquired beforehand in order to determine a likely thickening amount. So, after the printing conditions such as the output machine, output resolution, and paper are decided, page data including bar code data specifying the reduced width of each bar will be prepared according to the printing conditions. When printing the same bar codes with a different output machine, page data must be prepared all over again. In addition, even if page data including bar code data specifying a reduced width of each bar, when a different bar code is printed for every page by variable printing, there will arise a problem of a very large data amount since output data includes data of a thinned bar-code pattern for each page.

SUMMARY OF THE INVENTION

The object of this invention, therefore, is to provide a print data processing apparatus, a print data processing method, a printing system and program, a page data creating apparatus, and a rasterization processing apparatus, which are capable of optimizing a line width of bar codes printed by variable printing.

The above object is fulfilled, according to this invention, by a print data processing apparatus in a printing system for producing prints including a fixed area having identical contents throughout a plurality of pages, and a variable area having different contents for each of the plurality of pages, comprising a page data creating apparatus for creating page data expressing contents to be printed in a page description language; and a rasterization processing apparatus for converting the page data into raster data; wherein the page data creating apparatus includes an allocating condition setting device for setting allocating condition information for use in allocating page constituent elements expressed by objects into prints, to each of the objects as content information; a correction information embedding device for embedding, in the page data, as precondition information linked to allocating conditions of an object relating to a bar code to be allocated to the variable area, bar-code correction information indicating that the object is to be corrected; a common object defining device for defining, outside the content information, bar-code constituent elements provided for each type of bar code to express the bar code, as a common object for composing a different bar code for each page, to which the plurality of pages refer selectively; and a page data generating device for generating page data including the precondition information and the common object; and the rasterization processing apparatus includes a correction information searching device for searching the precondition information to check whether the bar-code correction information is embedded therein; a resolution acquiring device for acquiring a printing resolution corresponding to the type and allocating conditions of the bar code when the bar-code correction information is detected by the correction information searching device; a correcting device for determining an amount of correction based on the type of bar code, and the printing resolution acquired by the resolution acquiring device, and correcting the bar-code constituent elements; and a raster data generating device for generating raster data by composing a bar code using the bar-code constituent elements corrected by the correcting device.

According to such print data processing apparatus, when printing a bar code by variable printing, bar-code constituent elements for expressing bar codes are defined as a common object outside the content information at the stage of page data creation, to turn these elements into a common part repeatedly usable for a plurality of pages. At the stage of rasterization process, the common object is subjected to a bar-thinning correction. Thus, there is no need to create page data all over again to carry out the bar-thinning correction whenever an output machine or printing paper is changed. The page data created once can be used repeatedly even if the output machine or printing paper is changed, to print bar codes having a line width optimal for reading by a bar code reader.

In another aspect of the invention, there is provided a print data processing method for a printing system for producing prints including a fixed area having identical contents throughout a plurality of pages, and a variable area having different contents for each of the plurality of pages, comprising a page data creating step for creating page data expressing contents to be printed in a page description language; and a rasterization processing step for converting the page data into raster data; wherein the page data creating step includes an allocating condition setting step for setting allocating condition information for use in allocating page constituent elements expressed by objects into prints, to each of the objects as content information; a correction information embedding step for embedding, in the page data, as precondition information linked to allocating conditions of an object relating to a bar code to be allocated to the variable area, bar-code correction information indicating that the object is to be corrected; a common object defining step for defining, outside the content information, bar-code constituent elements provided for each type of bar code to express the bar code, as a common object for composing a different bar code for each page, to which the plurality of pages refer selectively; and a page data generating step for generating page data including the precondition information and the common object; and the rasterization processing step includes a correction information searching step for searching the precondition information to check whether the bar-code correction information is embedded therein; a resolution acquiring step for acquiring a printing resolution corresponding to the type and allocating conditions of the bar code when the bar-code correction information is detected in the correction information searching step; a correcting step for determining an amount of correction based on the type of bar code, and the printing resolution acquired in the resolution acquiring step, and correcting the bar-code constituent elements; and a raster data generating step for generating raster data by composing a bar code using the bar-code constituent elements corrected in the correcting step.

In a further aspect of the invention, there is provided a printing system for producing prints including a fixed area having identical contents throughout a plurality of pages, and a variable area having different contents for each of the plurality of pages, comprising the print data processing apparatus according to claim 1 or 2; and a printing apparatus for performing printing based on the raster data outputted from the print data processing apparatus.

In a still further aspect of the invention, there is provided a program readable by a computer for realizing, with the computer, a page data creating apparatus for creating page data expressing contents to be printed in a page description language, in a print data processing apparatus of a printing system which produces prints including a fixed area having identical contents throughout a plurality of pages, and a variable area having different contents for each of the plurality of pages, the program causing a CPU of the computer to execute, in memory, an allocating condition setting step for setting allocating condition information for use in allocating page constituent elements expressed by objects into prints, to each of the objects as content information; a correction information embedding step for embedding, in the page data, as precondition information linked to allocating conditions of an object relating to a bar code to be allocated to the variable area, bar-code correction information indicating that the object is to be corrected; a common object defining step for defining, outside the content information, bar-code constituent elements provided for each type of bar code to express the bar code, as a common object for composing a different bar code for each page, to which the plurality of pages refer selectively; and a page data generating step for generating page data including the precondition information and the common object.

In a still further aspect of the invention, there is provided a program readable by a computer for realizing, with the computer, a rasterization processing apparatus in a print data processing apparatus of a printing system which produces prints including a fixed area having identical contents throughout a plurality of pages, and a variable area having different contents for each of the plurality of pages, the rasterization processing apparatus converting, into raster data, page data with precondition information linked to allocating conditions of an object relating to a bar code to be allocated to the variable area, and embedded with bar-code correction information indicating that the object is to be corrected, and bar-code constituent elements provided for each type of bar code to express the bar code, defined outside content information as a common object for composing a different bar code for each page, to which the plurality of pages refer selectively, the program causing a CPU of the computer to execute, in memory, a correction information searching step for searching the precondition information to check whether the bar-code correction information is embedded therein; a resolution acquiring step for acquiring a printing resolution corresponding to the type and allocating conditions of the bar code when the bar-code correction information is detected in the correction information searching step; a correcting step for determining an amount of correction based on the type of bar code, and the printing resolution acquired in the resolution acquiring step, and correcting the bar-code constituent elements; and a raster data generating step for generating raster data by composing a bar code using the bar-code constituent elements corrected in the correcting step.

In a still further aspect of the invention, there is provided a page data creating apparatus for creating page data expressing contents to be printed in a page description language, in a printing system for producing prints including a fixed area having identical contents throughout a plurality of pages, and a variable area having different contents for each of the plurality of pages, comprising an allocating condition setting device for setting allocating condition information for use in allocating page constituent elements expressed by objects into prints, to each of the objects as content information; a correction information embedding device for embedding, in the page data, as precondition information linked to allocating conditions of an object relating to a bar code to be allocated to the variable area, bar-code correction information indicating that the object is to be corrected; a common object defining device for defining, outside the content information, bar-code constituent elements provided for each type of bar code to express the bar code, as a common object for composing a different bar code for each page, to which the plurality of pages refer selectively; and a page data generating device for generating page data including the precondition information and the common object.

In a still further aspect of the invention, there is provided a rasterization processing apparatus for converting, into raster data, page data expressing contents to be printed in a page description language, in a printing system for producing prints including a fixed area having identical contents throughout a plurality of pages, and a variable area having different contents for each of the plurality of pages, the page data including precondition information embedded with barcode correction information indicating that objects relating to bar codes to be allocated to the variable area are to be corrected, and bar-code constituent elements provided for each type of bar code to express the bar code and defined outside content information as a common object for composing a different bar code for each page, to which the plurality of pages refer selectively, the apparatus comprising a correction information searching device for searching the precondition information to check whether the bar-code correction information is embedded therein; a resolution acquiring device for acquiring a printing resolution corresponding to the type and allocating conditions of the bar code when the bar-code correction information is detected by the correction information searching device; a correcting device for determining an amount of correction based on the type of bar code, and the printing resolution acquired by the resolution acquiring device, and correcting the bar-code constituent elements; and a raster data generating device for generating raster data by composing a bar code using the bar-code constituent elements corrected by the correcting device.

Other features and advantages of the invention will be apparent from the following detailed description of the embodiments of the invention.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

Figure 1:
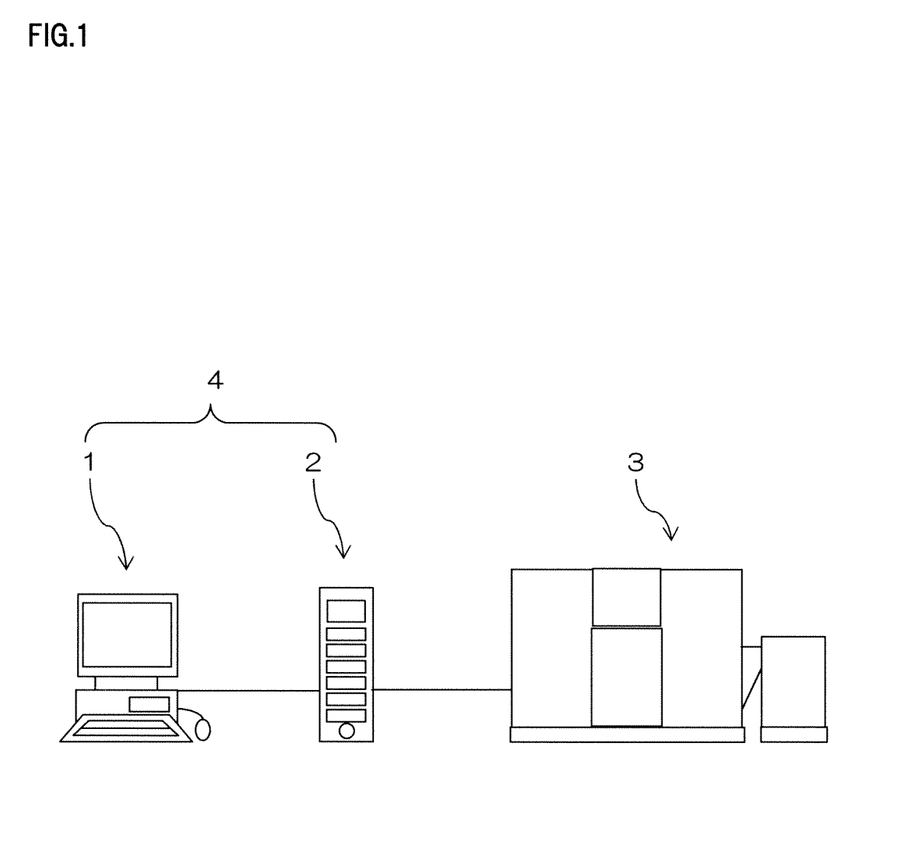
FIG. 1 is an overview schematically showing a printing system according to this invention.

An embodiment of this invention will be described hereinafter with reference to the drawings. FIG. 1 is an overview schematically showing a printing system according to this invention.

This printing system is constructed to carry out what is called variable printing for producing prints including a fixed area having identical contents throughout a plurality of pages, and a variable area having different contents for each page. The printing system includes a page data creating apparatus 1 for editing and laying out characters, patterns and so on which make up prints, a rasterization processing apparatus 2 for converting page data into raster data, and a printing apparatus 3. The page data creating apparatus 1 and the rasterization processing apparatus 2 constitute a print data processing apparatus 4. The page data creating apparatus 1 and the rasterization processing apparatus 2 are connected together to be capable of communication to each other, and so are the rasterization processing apparatus 2 and the printing apparatus 3.

The printing apparatus 3 is an output machine for outputting the print data from the print data processing apparatus 4 to a recording medium such as printing paper. Its printing method may be the electrophotographic mode or inkjet mode.

Figure 2:
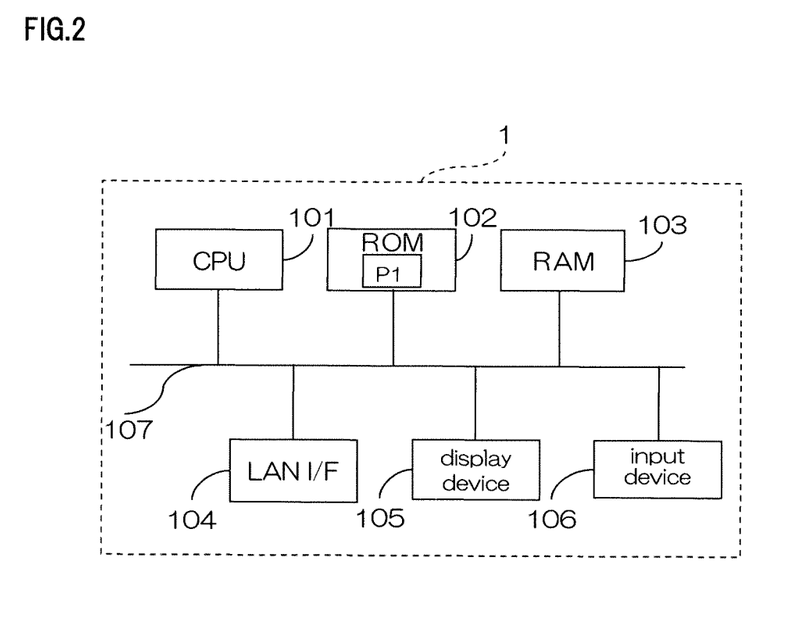
FIG. 2 is a block diagram showing a hardware configuration of a page data creating apparatus 1.

FIG. 2 is a block diagram showing a hardware configuration of the page data creating apparatus 1.

The page data creating apparatus 1 is realized by using a computer, which includes a CPU 101, a ROM 102, a RAM 103, a LAN interface 104, a display device 105 such as a liquid crystal display, and an input device 106 such as a keyboard and mouse. These components are connected to one another through a bus 107. The CPU 101 executes a page data creation program P1 mounted in the computer as software for generating page data. The ROM 102 stores the page data creation program P1. The RAM 103 serves as a work area for temporarily storing programs and data. The LAN interface 104 connects the page data creating apparatus 1 to a LAN (Local Area Network) to be capable of communication with the rasterization processing apparatus 2. The display device 105 displays various information such as a state of layout of characters, patterns and so on which make up prints. The input device 106 is used for various input operations by the operator.

Figure 3:
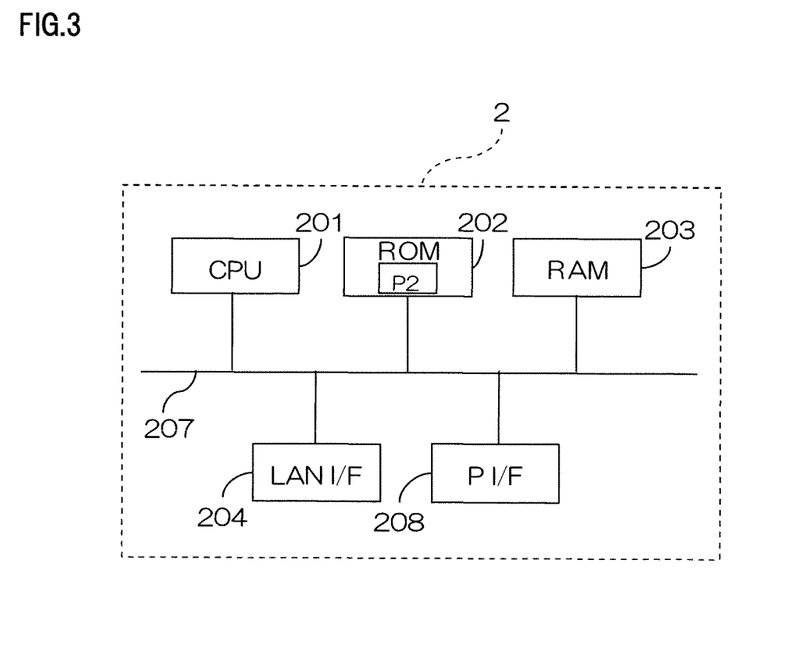
FIG. 3 is a block diagram showing a hardware configuration of a rasterization processing apparatus 2.

FIG. 3 is a block diagram showing a hardware configuration of the rasterization processing apparatus 2.

The rasterization processing apparatus 2 is realized by using a computer, which includes a CPU 201, a ROM 202, a RAM 203, a LAN interface 204, and a printer interface 208. These components are connected to one another through a bus 207. The CPU 201 executes a rasterization processing program P2 for rasterizing the page data. The ROM 202 stores the rasterization processing program P2. The RAM 203 serves as a work area for temporarily storing programs and data. The LAN interface 204 enables communication with the page data creating apparatus 1 through the LAN. The printer interface 208 enables communication with the printing apparatus 3 through a communication line. The page data creating apparatus 1, rasterization processing apparatus 2 and printing apparatus 3 may be connected to one another through the LAN, or may be connected directly without using the LAN.

Each of the above data creation program P1 and rasterization processing program P2 may be stored in a recording medium. When executing each of the page data creation program P1 and rasterization processing program P2, each program is installed in the computer from the recording medium, and as shown in FIGS. 2 and 3, is stored in the area within the computer where the program can be executed. The recording media may be non-transient recording media such as CD-ROMs, for example.

Figure 4:
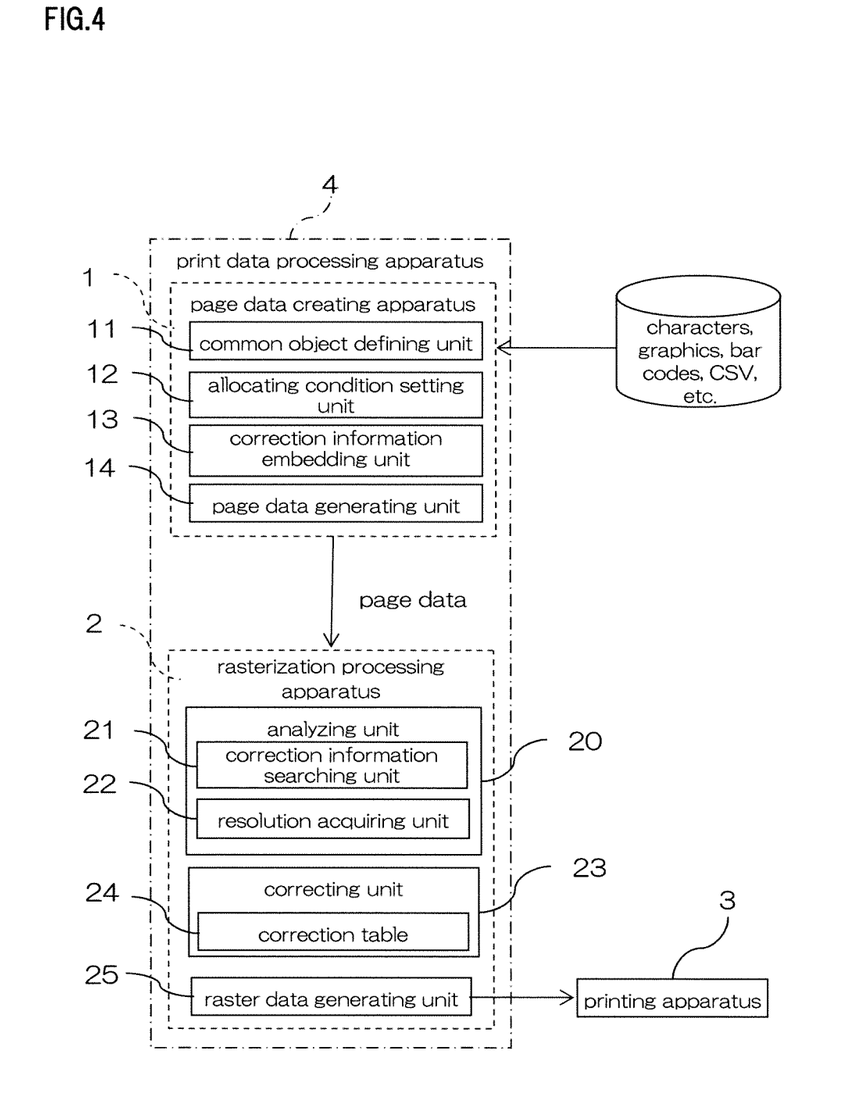
FIG. 4 is an explanatory block diagram of a functional construction realized in a print data processing apparatus 4.

FIG. 4 is an explanatory block diagram of a functional construction realized in the print data processing apparatus 4. In this embodiment, the page data created by the page data creating apparatus 1 will be described taking PDF for example.

The page data creating apparatus 1 includes, as components of its functional construction, a common object defining unit 11, an allocating condition setting unit 12, a correction information embedding unit 13, and a page data generating unit 14, which are provided by the CPU 101 executing the page data creation program P1 in the RAM 103.

The common object defining unit 11 links a character construction of a bar code allocated to the variable area of each page and a graphic forming a basic pattern of bar codes, using XObjects which are the concept of image objects of PDF. One-dimensional bar codes are created by combining and arranging basic patterns each corresponding to one character of numbers 0-9 and/or the alphabet of A-Z, which can be expressed according to the type of bar codes. Therefore, when creating page data for printing a different bar code for each page, such as a customer management code or a code for a transfer slip used for payment at a convenience store, the basic patterns which are bar-code constituent elements for expressing a bar code used repeatedly are defined as common parts, outside content information which describes information on objects such as graphics and patterns other than the bar codes.

The allocating condition setting unit 12 sets to each object, as content information, allocating condition information for allocating, on prints, page constituent elements such as characters, graphics and patterns expressed by objects. That is, information as to which object is allocated to which position of which page of the prints is described in the content information. This allocating condition setting unit 12 describes the allocating condition information on all the objects, including combination information on the allocation of the bar code and the basic pattern varying from page to page. When describing the object allocation information in the content information, a label number corresponding to the name of each object, and so on, are assigned.

The correction information embedding unit 13 embeds, in the page data, as precondition information linked to the allocating conditions of an object relating to a bar code described in the content information, bar-code correction information indicating that this bar code is to be corrected. Supposing, for example, that a label number assigned to the object name "BarCode" is "05", the bar-code correction information will be embedded in the page data by describing this "05" in meta-information.

The page data generating unit 14 lays out the respective objects based on the object allocation information, and generates a PDF having the meta-information as the precondition information according to this invention, XObjects as the common objects according to this invention, and the content information.

The rasterization processing apparatus 2 realizes a function of RIP (Raster Image Processor), and includes, as functional components, an analyzing unit 20 having a correction information searching unit 21 and a resolution acquiring unit 22, a correcting unit 23, and a raster data generating unit 25, which are provided by the CPU 201 executing the rasterization processing program P2 in the RAM 203.

The correction information searching unit 21 analyzes the PDF outputted from the page data creating apparatus 1, and searches to check whether bar-code information is embedded in the meta-information.

The resolution acquiring unit 22 acquires a printing resolution appropriate for the type of bar code and allocating conditions obtained from the analysis of the PDF. The allocating conditions include the width and orientation of the bar code. This is because, when setting the bar code to a predetermined width on printing paper, the printing resolution needs to be high enough to distinguish black and white of a one-dimensional bar code formed of black bars and white bars, and because, depending on the specifications of the printing apparatus or a resolution designated at the time of output, a difference may arise between printing resolutions longitudinally and transversely of printing paper.

The correcting unit 23, based on the type of bar code, printing resolution, and so on, determines an amount of correction relative to the basic pattern of the bar code turned into an XObject, and corrects the basic pattern of the bar code. In this embodiment, the correcting unit 23 has a correction table 24 to refer to in determining the amount of correction.

The raster data generating unit 25 composes and lays out the bar code of each page using the corrected basic pattern of the bar code, and carries out a rasterization process to generate raster data to be fed to the printing apparatus 3.

Figure 5:
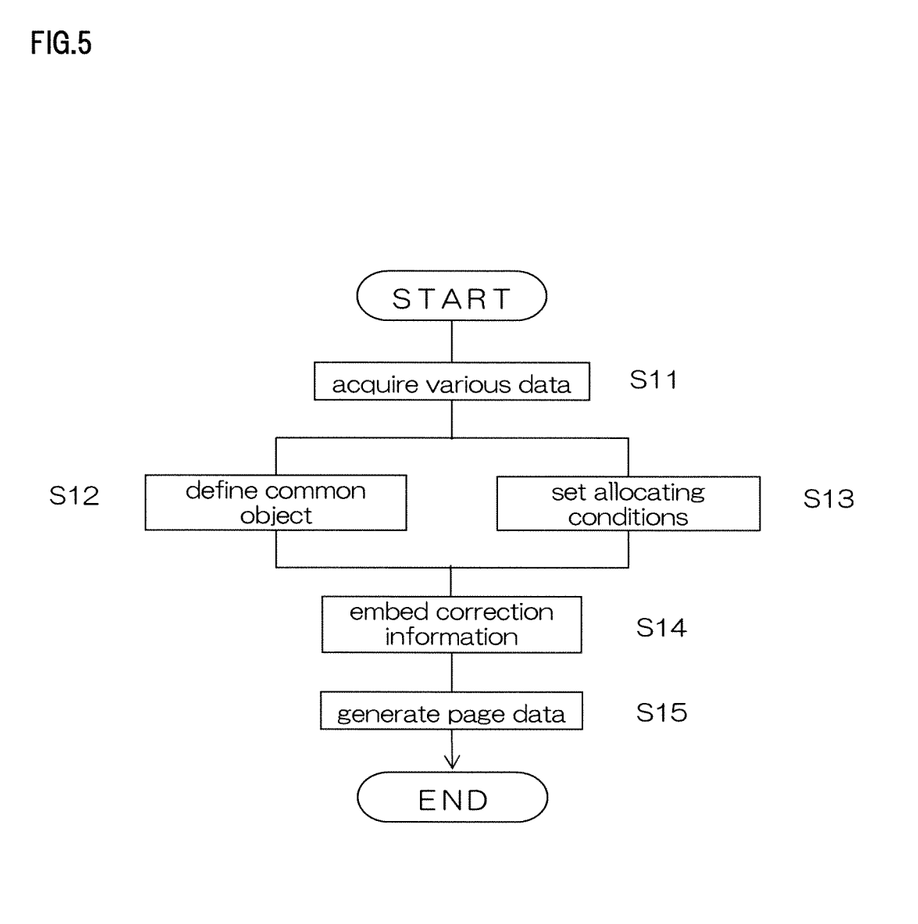
FIG. 5 is a flow chart showing a sequence of creating page data by the page data creating apparatus 1.
Figure 6:
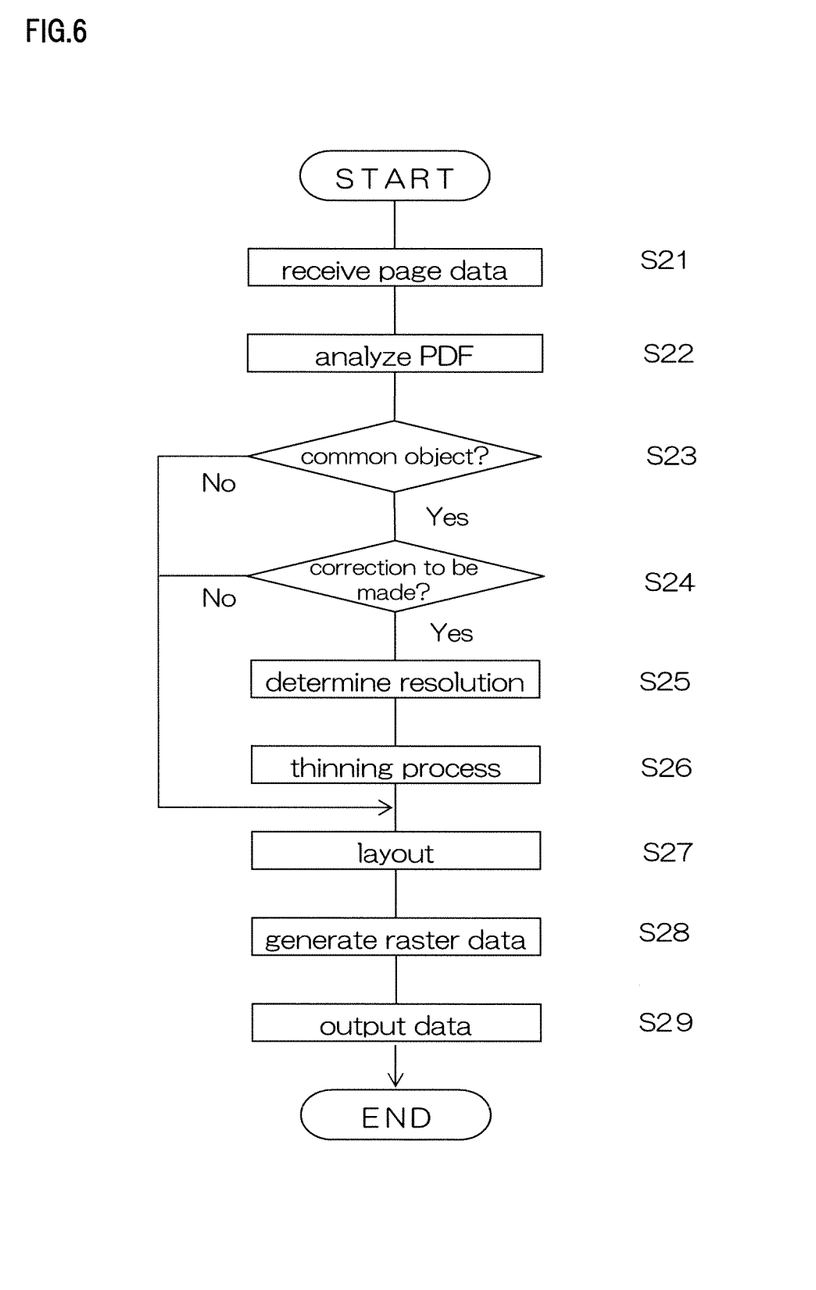
FIG. 6 is a flow chart showing a sequence of creating raster data by the rasterization processing apparatus 2.
Figure 7:
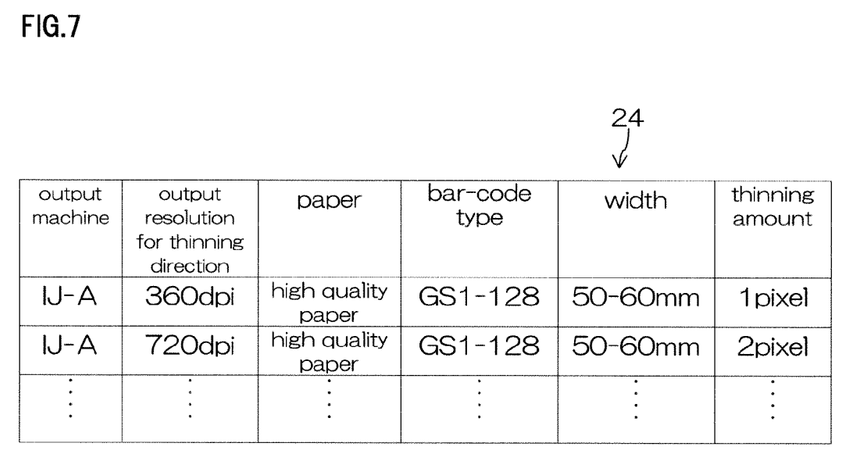
FIG. 7 is a view showing an example of correction table 24.
Figure 8:
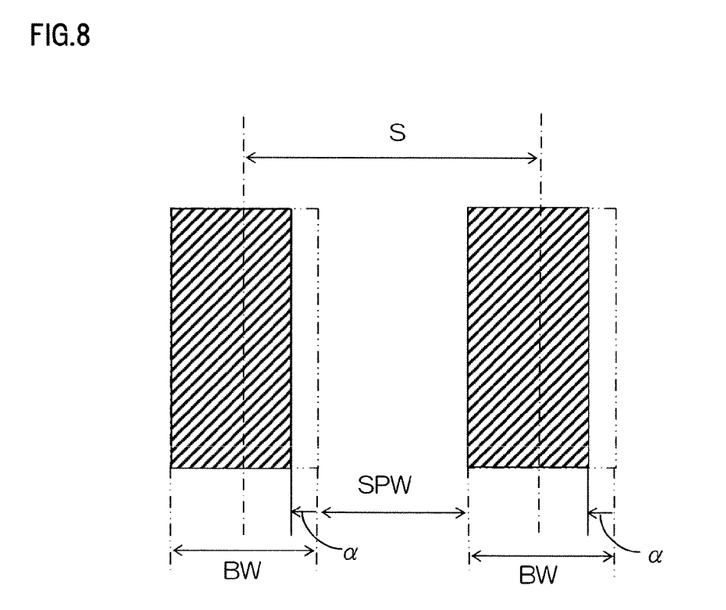
FIG. 8 is an explanatory view schematically showing correction of a bar code.

FIG. 5 is a flow chart showing a sequence of creating page data by the page data creating apparatus 1. FIG. 6 is a flow chart showing a sequence of creating raster data by the rasterization processing apparatus 2. FIG. 7 is a view showing an example of correction table 24. FIG. 8 is an explanatory view schematically showing correction of a bar code.

When the page data creation program P1 is started, as shown in FIG. 5, the page data creating apparatus 1, in response to an input operation of the operator, acquires various data such as variable data in CSV (Comma Separated Value) format, e.g. characters, graphics, patterns, basic pattern of the bar code, address list, and so on, which should be allocated to each page of the prints to be produced, from an external database through the LAN or from a portable recording medium such as a CD-ROM (step S11). Then, the graphic data of the basic pattern of the bar code is turned into an XObject as the common object (step S12). Based on a further input operation of the operator, conditions for allocating the objects on the prints are set while the respective objects are laid out (step S13). After setting conditions for allocating the bar code, bar-code correction information indicating that the bar code is a subject for correction is embedded in the meta-information (step S14). Subsequently, a PDF having the meta-information, XObjects and content information is generated (step S15).

With start of the rasterization processing program P2, as shown in FIG. 6, the rasterization processing apparatus 2 receives the PDF generated by the page data creating apparatus 1 (step S21), and then the PDF is analyzed by the analyzing unit 20 (step S22). The PDF's content information, XObjects, and the contents described in the meta-information are decoded. When the PDF holds XObjects (step S23), the meta-information is searched to check whether bar-code correction information is included therein (step S24). If bar-code correction information is included in the meta-information, a printing resolution is determined (step S25). Then, based on an amount of correction obtained by referring to the correction table 24 shown in FIG. 7, a correction is carried out to thin each bar of the basic pattern of the bar code turned into an XObject (step S26). The basic pattern of the bar code after the thinning correction is temporarily held for reuse by the rasterization processing apparatus 2.

The correction table 24 is provided beforehand for the rasterization processing apparatus 2. As shown in FIG. 7, this table 24 has been prepared as a reference table giving items including model of output machine, resolution for printing, type of paper, type of bar code, width of bar code, and thinning amount which is amount of correction. Amounts of correction (thinning amounts) are obtained based on how much thicker the black bars of the bar codes formed by printing have grown from optimal widths as a result of actually printing various bar codes with different types of printing apparatus by changing resolution and types of printing paper. This correction table 24 is created by linking these amounts of correction with information on the output machines, output resolutions for the thinning direction, the types of paper, the type of bar codes, and the widths of the bar codes. The correction table 24 can be rewritten in response to changes and expansions of the printing apparatus 3 forming part of the printing system. That is, changes in the configuration of the printing system can easily be accommodated by rewriting and updating the contents of the correction table 24.

Further, the bar-code thinning correction will be described in detail. Assume, for example, that the PDF holds, as XObjects, 128 basic patterns corresponding to 128 types of characters of GS1-128 (which is a bar-code standard used for the payment slips at convenience stores or the commodity labels of medical instruments) (step S23). When a search through the meta-information has found bar-code correction information indicating that GS1-128 is a target for correction (step S24), a resolution corresponding to the type of bar codes of GS1-128, and the width (50-60 mm) and orientation of the bar codes is determined (Step S25). Assume at this time that the printing apparatus 3 connected to the rasterization processing apparatus 2 is a model called IJ-A which does printing in the inkjet mode, and that the output resolution for the thinning direction is 360 dpi. Then, the correction table 24 of FIG. 7, when referred to, shows that the amount of thinning the bar codes in printing the bar codes on high-quality paper is one pixel. When a thinning process is carried out (step S26), as shown in FIG. 8, each black bar of the basic pattern of the bar code will be thinned to have a bar width BW shown in two-dot chain lines reduced by a thinning amount alpha, i.e. by one pixel, with respect to a stroke S which provides an interval between adjacent black bars.

In the above example of correction, as shown in FIG. 8, when the process is carried out to thin each of these black bars, as far as data is concerned, a space width SPW corresponding to each white bar portion will enlarge by a thinned amount of a black bar, and the correction will bring about no change in the width of the bar code. However, as long as no problem is caused in the reading accuracy of the bar code reader, it is possible to make no change in the space width SPW between before and after the correction. For example, when printing resolution is corrected afterward from low resolution to high resolution (from 360 dpi to 720 dpi), even if the bar code width is reduced as a whole by thinning the back bars without changing the space widths SPW, the reading accuracy of the bar code reader will not be impaired as long as black-and-white contrast is clear. Therefore, as a preliminary function for correcting resolution, a function may be additionally provided for allowing a selection whether or not to change the space width SPW or bar-code width when carrying out the thinning process.

Referring to FIG. 6 again, when the correction of each basic pattern of the bar code is completed, the bar code is composed for each page using the corrected basic pattern of the bar code held as XObject, a layout is carried out to incorporate the composed bar code in each page (step S27). Subsequently, a rasterization process is carried out to generate raster data (step S28), and the raster data is outputted (step S29). When the PDF holds no XObject (step S23), or when, although the PDF holds an XObject, the meta-information includes no bar-code correction information and the object turned into the XObject is not to be corrected (step S24), the thinning process is skipped, and a layout (step S27) and a rasterization process are carried out to generate raster data (step S28).

The printing apparatus 3 receives the output data from the rasterization processing apparatus 2, and performs printing based on the output data. In this embodiment, as described above, the rasterization processing apparatus 2 carries out the thinning process taking account of the thickening amount of the black bars occurring at the time of printing. Thus, the printed bar code has a clear contrast between black bars and white bars, thereby not to impair reading by the bar code reader.

In this embodiment, the basic pattern of the bar code is turned into an XObject in the PDF, which realizes a reduced data amount of the PDF created by the page data creating apparatus 1. By turning the basic pattern of the bar code into an XObject in the PDF, the rasterization processing apparatus 2 can carry out the bar-code rasterization process at high speed.

In this embodiment, the rasterization processing apparatus 2 carries out the barcode thinning process. When a different printing apparatus is used to reprint only pages determined to be faulty prints, for example, a bar-code thinning process suited to this printing apparatus does not need to be carried out all over again from the stage of page data generation, as needed in the prior art. Thus, in this embodiment, the correction of the line width of bar codes and the rasterization process can be performed efficiently.

This invention may be embodied in other specific forms without departing from the spirit or essential attributes thereof and, accordingly, reference should be made to the appended claims, rather than to the foregoing specification, as indicating the scope of the invention.

This application claims priority benefit under 35 U.S.C. Section 119 of Japanese Patent Application No. 2011-215883 filed in the Japanese Patent Office on Sep. 30, 2011, the entire disclosure of which is incorporated herein by reference

What is claimed is:

1. A print data processing apparatus in a printing system for producing prints including a fixed area having identical contents throughout a plurality of pages, and a variable area having different contents for each of the plurality of pages, comprising:
 a page data creating apparatus for creating page data expressing contents to be printed in a page description language; and
 a rasterization processing apparatus for converting the page data into raster data;
 wherein the page data creating apparatus includes:
 an allocating condition setting device for setting allocating condition information for use in allocating page constituent elements expressed by objects into prints, to each of the objects as content information;
 a correction information embedding device for embedding, in the page data, as precondition information linked to allocating conditions of an object relating to a bar code to be allocated to the variable area, bar-code correction information indicating that the object is to be corrected;
 a common object defining device for defining, outside the content information, bar-code constituent elements provided for each type of bar code to express the bar code, as a common object for composing a different bar code for each page, to which the plurality of pages refer selectively; and
 a page data generating device for generating page data including the precondition information and the common object; and
 the rasterization processing apparatus includes:
 a correction information searching device for searching the precondition information to check whether the bar-code correction information is embedded therein;
 a resolution acquiring device for acquiring a printing resolution corresponding to the type and allocating conditions of the bar code when the bar-code correction information is detected by the correction information searching device;
 a correcting device for determining an amount of correction based on the type of bar code, and the printing resolution acquired by the resolution acquiring device, and correcting the bar-code constituent elements; and a raster data generating device for generating raster data by composing a bar code using the bar-code constituent elements corrected by the correcting device.

2. The print data processing apparatus according to claim 1, wherein:

the rasterization processing apparatus includes a correction table having, as correspondence items, at least a type of bar code, a printing resolution, and an amount of correction; and the correcting device corrects the bar-code constituent elements by applying an amount of correction selected with reference to the correction table.

3. A printing system for producing prints including a fixed area having identical contents throughout a plurality of pages, and a variable area having different contents for each of the plurality of pages, comprising:

the print data processing apparatus according to claim 1 or 2; and a printing apparatus for performing printing based on the raster data outputted from the print data processing apparatus.

4. The print data processing apparatus according to claim 1, wherein the correction table further includes as correspondence items: a width of barcode, a type of paper, a model of an output machine, and a type of paper.

5. A print data processing method for a printing system for producing prints including a fixed area having identical contents throughout a plurality of pages, and a variable area having different contents for each of the plurality of pages, comprising:

a page data creating step for creating page data expressing contents to be printed in a page description language; and a rasterization processing step for converting the page data into raster data;

wherein the page data creating step includes:

an allocating condition setting step for setting allocating condition information for use in allocating page constituent elements expressed by objects into prints, to each of the objects as content information;

a correction information embedding step for embedding, in the page data, as precondition information linked to allocating conditions of an object relating to a bar code to be allocated to the variable area, bar-code correction information indicating that the object is to be corrected;

a common object defining step for defining, outside the content information, bar-code constituent elements provided for each type of bar code to express the bar code, as a common object for composing a different bar code for each page, to which the plurality of pages refer selectively; and a page data generating step for generating page data including the precondition information and the common object; and the rasterization processing step includes:

a correction information searching step for searching the precondition information to check whether the bar-code correction information is embedded therein;

a resolution acquiring step for acquiring a printing resolution corresponding to the type and allocating conditions of the bar code when the bar-code correction information is detected in the correction information searching step;

a correcting step for determining an amount of correction based on the type of bar code, and the printing resolution acquired in the resolution acquiring step, and correcting the bar-code constituent elements; and a raster data generating step for generating raster data by composing a bar code using the bar-code constituent elements corrected in the correcting step.

6. A non-transitory computer readable medium having executable instructions stored thereon for realizing, with a computer, a rasterization processing apparatus in a print data processing apparatus of a printing system which produces prints including a fixed area having identical contents throughout a plurality of pages, and a variable area having different contents for each of the plurality of pages, the rasterization processing apparatus converting, into raster data, page data with precondition information linked to allocating conditions of an object relating to a bar code to be allocated to the variable area, and embedded with bar-code correction information indicating that the object is to be corrected, and bar-code constituent elements provided for each type of bar code to express the bar code, defined outside content information as a common object for composing a different bar code for each page, to which the plurality of pages refer selectively, the instructions which when executed by the computer cause the computer to perform steps of:

a correction information searching step for searching the precondition information to check whether the bar-code correction information is embedded therein;

a resolution acquiring step for acquiring a printing resolution corresponding to the type and allocating conditions of the bar code when the bar-code correction information is detected in the correction information searching step;

a correcting step for determining an amount of correction based on the type of bar code, and the printing resolution acquired in the resolution acquiring step, and correcting the bar-code constituent elements; and a raster data generating step for generating raster data by composing a bar code using the bar-code constituent elements corrected in the correcting step.

7. A rasterization processing apparatus for converting, into raster data, page data expressing contents to be printed in a page description language, in a printing system for producing prints including a fixed area having identical contents throughout a plurality of pages, and a variable area having different contents for each of the plurality of pages, the page data including precondition information embedded with bar-code correction information indicating that objects relating to bar codes to be allocated to the variable area are to be corrected, and bar-code constituent elements provided for each type of bar code to express the bar code and defined outside content information as a common object for composing a different bar code for each page, to which the plurality of pages refer selectively, the apparatus comprising:

a correction information searching device for searching the precondition information to check whether the bar-code correction information is embedded therein;

a resolution acquiring device for acquiring a printing resolution corresponding to the type and allocating conditions of the bar code when the bar-code correction information is detected by the correction information searching device;

a correcting device for determining an amount of correction based on the type of bar code, and the printing resolution acquired by the resolution acquiring device, and correcting the bar-code constituent elements; and a raster data generating device for generating raster data by composing a bar code using the bar-code constituent elements corrected by the correcting device.

\* \* \* \* \*